(12) United States Patent
Devillez et al.

(10) Patent No.: US 12,209,447 B2
(45) Date of Patent: Jan. 28, 2025

(54) DEVICE FOR EMERGENCY OPENING OF AN AIRCRAFT DOOR WITH PERIPHERAL RETAINING MEMBER

(71) Applicant: LATECOERE, Toulouse (FR)

(72) Inventors: Sébastien Devillez, Saint Jean (FR); Christian Reidt, Saint Loup Cammas (FR)

(73) Assignee: LATECOERE, Toulouse (FR)

( * ) Notice: Subject to any disclaimer, the term of this patent is extended or adjusted under 35 U.S.C. 154(b) by 177 days.

(21) Appl. No.: 18/006,600

(22) PCT Filed: Jul. 23, 2021

(86) PCT No.: PCT/EP2021/070697
§ 371 (c)(1),
(2) Date: Jan. 24, 2023

(87) PCT Pub. No.: WO2022/023212
PCT Pub. Date: Feb. 3, 2022

(65) Prior Publication Data
US 2023/0272654 A1 Aug. 31, 2023

(30) Foreign Application Priority Data
Jul. 30, 2020 (FR) ........................................ 2008083

(51) Int. Cl.
*B64C 1/14* (2006.01)
*E05F 1/08* (2006.01)
*F16F 13/00* (2006.01)

(52) U.S. Cl.
CPC .............. *E05F 1/08* (2013.01); *F16F 13/007* (2013.01); *E05Y 2201/474* (2013.01);
(Continued)

(58) Field of Classification Search
CPC ............. F16F 13/007; E05Y 2900/502; B64C 1/1423; B64C 1/1407
See application file for complete search history.

(56) References Cited

U.S. PATENT DOCUMENTS 3,940,887 A * 3/1976 Slaybaugh .............. E05F 15/50
91/394
5,156,359 A * 10/1992 Noble ..................... E05B 5/003
292/DIG. 31

(Continued)

FOREIGN PATENT DOCUMENTS

FR 2814771 4/2002
FR 2830564 4/2003

(Continued)

*Primary Examiner* — Brian M O'Hara
(74) *Attorney, Agent, or Firm* — Defillo & Associates, Inc; Evelyn A. Defillo

(57) ABSTRACT

A device for emergency opening of an aircraft door having: a tubular actuating member (7) which includes a first end plate (8) and a second end plate (9); an elastic compression device having a tubular spring (10) compressed between the first end plate (8) and the second end plate (9); an expansion regulator (17, 18) arranged inside the tubular spring (10); a retaining member which includes at least one peripheral attachment connecting the first end plate (8) to the second end plate (9), the peripheral attachment being radially outside the tubular spring (10).

13 Claims, 5 Drawing Sheets

(52) U.S. Cl.
CPC ... *E05Y 2800/252* (2013.01); *E05Y 2900/502* (2013.01); *E05Y 2900/531* (2013.01)

(56) References Cited

U.S. PATENT DOCUMENTS

| | | | |
|---|---|---|---|
| 9,327,820 B2* | 5/2016 | Lamat | E05B 65/10 |
| 11,878,804 B2* | 1/2024 | Devillez | B64C 1/1407 |
| 2014/0084600 A1* | 3/2014 | Lamat | E05B 65/10 292/92 |

FOREIGN PATENT DOCUMENTS

| | | |
|---|---|---|
| FR | 2864021 | 6/2005 |
| FR | 2975967 | 12/2012 |
| WO | WO2020020861 | 1/2020 |

* cited by examiner

DEVICE FOR EMERGENCY OPENING OF AN AIRCRAFT DOOR WITH PERIPHERAL RETAINING MEMBER

CROSS REFERENCE TO RELATED APPLICATION

This application is a national stage entry of PCT/EP2021/070697 filed Jul. 23, 2021, under the International Convention and claiming priority over French Patent Application No. FR2008083 filed Jul. 30, 2020.

TECHNICAL FIELD

The invention relates to the field of aeronautics and relates more particularly to a device for emergency opening of an aircraft door.

Aircraft doors can be opened to allow access to the cabin or holds, or to allow evacuation in case of emergency. In the event of emergency evacuation of passengers, aircraft doors, whether passenger doors or emergency evacuation doors, usually comprise a device for emergency opening, which if it is activated, provokes rapid opening without significant effort, whatever the possible position of the aircraft at the time of the evacuation. It is imperative that only little effort is required to trigger the emergency opening device.

PRIOR ART

At the present time, as described in particular in patent application FR2830564, the actuating means traditionally consist of an actuator of the pneumatic type supplied by means of a secondary reserve of engine fluid. However, such actuating means have several disadvantages. In fact, they have relatively significant weights and spatial requirements, due in particular to the presence of the secondary reserve of engine fluid. They furthermore require the performance of periodic checks of the pressure of the engine fluid, and maintenance or perhaps periodic replacement of the secondary reserve, even in the absence of use of same. Finally, after activation of the emergency opening device, these actuating means require, in order to be once more operational, an overhaul of the secondary reserve of engine fluid.

Another current solution described in particular in patent application FR2864021 makes it possible to reduce the spatial requirement and the weight of the actuating means. In fact, according to this solution, the actuating means consist of a pyrotechnic jack, that is to say an independent jack not requiring a source of supply of engine fluid. In contrast, such pyrotechnic jacks need to be periodically inspected and replaced even in the absence of use. These pyrotechnic jacks must furthermore be overhauled after activation of the emergency opening device. This obviously gives rise to the problem of transporting and storing explosive elements.

Patent application FR2975967 describes a device for emergency opening of an aircraft that remedies the disadvantages described above. This emergency opening device consists of actuating means of mechanical design making it possible to dispense with pneumatic or pyrotechnic elements. The weight and spatial requirement of the emergency opening device are thereby reduced, reliability is improved, and this device requires little or no maintenance. However, the emergency opening device described remains complex and bulky. Furthermore, the addition of means of controlling the emergency opening device increases the general spatial requirement of the device.

SUMMARY OF THE INVENTION

The aim of the invention is to improve the emergency opening devices of the prior art.

For this purpose, the invention envisages a device for emergency opening of an aircraft door having:
- a tubular actuating member extending along an axial direction, provided with a first connecting end and a second connecting end, this tubular actuating member being switchable between a retracted rest position and a deployed opening position;
- elastic compression means able to attract the tubular actuating member from its retracted position to its deployed position;
- a member for retaining the tubular actuating member in its retracted position with compression of the elastic means of compression maintained;
- triggering means able to liberate the retaining member and to cause the tubular actuating member to pass to its deployed position due to the expansion effect of the elastic compression means.

In this emergency opening device:
- the tubular actuating member comprises a first end plate, situated towards the first connecting end, and a second end plate, situated towards the second connecting end;
- the elastic compression means comprise a tubular spring compressed between the first end plate and the second end plate;
- an expansion regulator is arranged inside the tubular spring;
- the retaining member comprises at least one peripheral attachment connecting the first end plate to the second end plate, this peripheral attachment being radially outside the tubular spring.

Such an emergency opening device has all the advantages of a mechanical device as described in the document FR2975967. The actuating means have a reduced weight and spatial requirement. The mechanical design of the actuating means requires no particular maintenance in the absence of use of the opening device. No engine fluid is needed to activate the actuating means.

The invention furthermore envisages an extremely compact arrangement of the emergency opening device that simultaneously includes the assembly of the mechanical elements producing the opening movement, the triggering elements and the elements allowing controlled opening.

The emergency opening device can thus be dimensioned to provide a significant opening force that results in rapid opening of the aircraft door, relying for example on damping the movement of the door along the opening distance by means of the expansion regulator, which is integrated inside the emergency opening device, or controlling door opening and closing when the tubular actuating member is in the retracted position.

The triggering elements can furthermore also be entirely mechanical, which results in an entirely mechanical emergency opening device and which does not require any connection to an outside energy source or to a remote control. Such a device forms a finished product of the independent mechanical jack type, which is a guarantee of appreciable reliability and functioning safety in the field of aeronautics and more particularly that of emergency opening devices.

In the emergency opening device according to the invention, retaining the actuating member is not based on any moving mechanism whose parts would need complex means in order to remain mobile under load (roller bearings, bushes, etc.) and would be subject to wear by friction, chafing and other disadvantages relating to mobile mechanical parts remaining under high loads.

The invention allows the emergency opening systems of the prior art to be drastically simplified by eliminating numerous mechanical parts, which makes the device lighter, more compact and more reliable, as well as reducing its cost.

The emergency opening device according to the invention can comprise the following additional characteristics, singly or combined;
- the retaining member comprises a plurality of peripheral attachments radially outside the tubular spring, each of these peripheral attachments comprising a retaining bar;
- each of the retaining bars extends between an opening made in the first end plate and an opening made in the second end plate and comprises at one of its ends a fixed head, the triggering means comprising a disengageable head at the other end of the retaining bar;
- the peripheral attachment comprises a retaining wire;
- the retaining wire makes at least one return travel between the first end plate and the second end plate;
- the triggering means comprise a disengageable head fixing one end of the retaining wire with respect to an orifice of one of the end plates;
- the triggering means comprise a member for transversally severing the retaining wire;
- the first end plate comprises an inner guiding cylinder extending along the axial direction and the second end plate comprises an outer guiding cylinder extending in the axial direction, the inner guiding cylinder and the outer guiding cylinder being concentric and slotted together along a sliding link;
- the expansion regulator comprises a jack chamber delimited by the inner guiding cylinder;
- the expansion regulator comprises a mobile piston in the jack chamber, along the axial direction;
- the piston is connected by a rod to the second connecting end, the rod passing through a bottom wall of the inner guiding cylinder and through the second end plate;
- the rod comprises a stop for driving the rod through the second end plate;
- the stop is arranged on the portion of the rod that is situated between the second end plate and the second connecting end.

The device according to the invention can comprise high strength elastic means, that is to say, designed to exert a significant opening force on the opening mechanism of the door, which is needed in this emergency door opening application. In spite of the high strength of the elastic elements, the actuating means are activated without effort. In its embodiment with a retaining wire, the retaining wire allows a high degree of decoupling between the force making it possible to maintain the strength of the elastic means and the force needed to trigger the device. Even with high strength elastic means involving high tension of the wire, minimum force will be needed to sever it transversally. The ratio between retaining effort and triggering effort is very favorable and the invention makes it possible to increase the strength of the elastic means while reducing the triggering effort.

BRIEF DESCRIPTION OF THE DRAWINGS

Other characteristics and advantages of the invention will emerge from the non-limitative description that follows with reference to the attached drawings, in which.

DETAILED DESCRIPTION OF THE INVENTION

Figure 1:
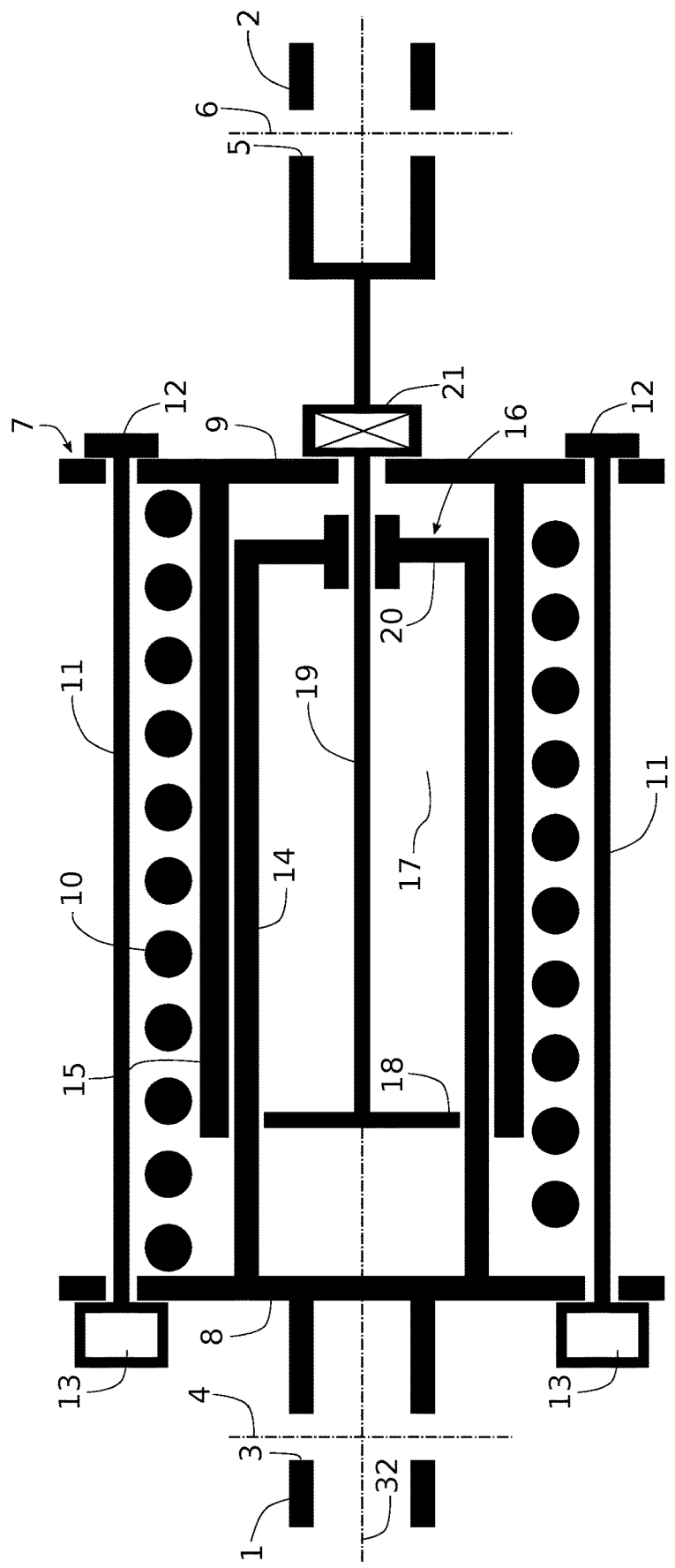
FIG. 1 is a schematic view in section of an emergency opening device according to a first embodiment of the invention.

FIG. 1 illustrates a first embodiment of the invention. This FIG. 1 is a basic diagram schematically showing the main elements of a device for emergency opening of an aircraft door along a longitudinal section.

The emergency opening device is a compact element presented in the form of a jack, which comprises a first connecting end 1 and a second connecting end 2.

The emergency opening device is provided for installation in an aircraft door, such that a separation movement of the two connecting ends 1,2 causes the aircraft door to open. As an example, the emergency opening device can be installed such that the first connecting end 1 and the second connecting end 2 are connected to elements of the door allowing it to open by expansion. According to another example, the two connecting ends can be attached within the actual opening mechanism of the door, between two levers whose separation causes the aircraft door to open.

The first connecting end 1 comprises a pivot 3 allowing a pivot of axis 4 to connect with the aircraft door. Likewise, the second connection end 2 comprises a pivot 5 allowing a pivot of axis 6 to connect with the aircraft door.

The emergency opening device comprises a tubular actuating member 7, which is switchable between a retracted rest position (that of FIG. 1) and an opening deployed position corresponding to a maximum separation of the connecting ends 1,2. When the aircraft is operating normally, the emergency opening device is constantly in its configuration in which the tubular actuating member is in its retracted rest position. It is only when an exceptional situation necessitates the emergency opening of the aircraft door that the emergency opening device is triggered and the tubular actuating member passes from its retracted position to its deployed position.

The tubular actuating member 7 includes:
- a first end plate 8 on which the first connecting end 1 is attached;
- a second end plate 9 situated towards the second connecting end 2.

The plates extend in a radial plane perpendicular to the axial direction, but are not necessarily flat over their entire surface.

The emergency opening device further comprises elastic compression means, which here comprise a tubular spring 10, which is compressed between the two end plates 8,9. When the tubular actuating member 7 is in its retracted position, the spring 10 is in maximum compression position and stores the potential elastic energy needed for emergency opening of the aircraft door. This potential elastic energy corresponds to the energy needed to open an aircraft door very quickly, whose weight can potentially be of the order of about one hundred kilos, and involves dimensioning the compression spring accordingly.

The tubular nature of the spring 10 should be understood in the wider sense: the spring 10 can be cylindrical or conical, for example. It can be made by any means such as a helicoidal spring or a stack of spring washers.

According to this first embodiment, the emergency opening device comprises a retaining member of the tubular actuating member 7 in its retracted position, which allows the spring 10 to be held in a compressed position. This retaining member here comprises at least two retaining bars 11 each comprising a fixed head 12 supported on the periphery of an orifice of the second end plate 9 accommodating the retaining bar 11.

The emergency opening device further comprises triggering means able to liberate this retaining member so as to cause the tubular actuating member 7 to pass to its deployed position due to the expansion effect of the elastic compression means, that is to say the effect of releasing the spring. These triggering means comprise a disengageable head 13 mounted on the end of each retaining bar 11, at their end opposite the fixed head 12. Like the fixed heads 12, each disengageable head 13 is supported on the periphery of an orifice of the first end plate 8 accommodating the retaining bar 11.

The retaining bars 11 can for example be steel bars dimensioned to have the tensile strength needed to maintain the compression of the spring 10, between the fixed heads 12 abutted on the second end plate 9 and the disengageable heads 13 abutted on the first end plate 8.

The disengageable heads 13 can be implemented by any means (mechanical, electromechanical, hydraulic, pyrotechnic, for example), making it possible to separate on command the disengageable head 13 from the corresponding retaining bar 11.

Thus, when users wish to trigger the emergency opening device, they command the disengagement of the disengageable heads 13, which separate from their respective retaining bars 11, which liberates the retaining member and allows the tubular actuating member to move to its deployed position.

According to a preferred example, the retaining bars 11 can be threaded bars and the disengageable heads 13 can consist of an expandable nut. The expandable nuts are known electromechanical devices that comprise an actuator cooperating with a hinged nut able to be opened by an electrical command such that the engagement of the nut on the threaded bar is liberated immediately and the nut becomes sliding on the retaining bar 11 when it is triggered.

The schematic view of FIG. 1 shows as an example two retaining bars 11. However, in view in particular of the spring force to contain, the retaining member can comprise as many of these retaining bars 11 as necessary, angularly spaced around the spring 10.

In this embodiment, the emergency opening device is preferably triggered by simultaneously triggering the triggering means, that is to say by simultaneously disengaging all of the disengageable heads 13.

The retaining bars 11 extend along the axial direction 32 of the emergency opening device. The retaining bars 11 here consist of peripheral attachments of the retaining member, these peripheral attachments being arranged in a position radially outside the spring 10.

The tubular actuating member 7 has the benefit of a linear guide along the axial direction 32, allowing its telescopic nature, by means of:
an inner guiding cylinder 14 attached to the first end plate 8 and extending along the axial direction 32;
an outer guiding cylinder 15 attached to the second end plate 9 and also extending along the axial direction 32, coaxially to the inner guiding cylinder 14.

The two guiding cylinders 14, 15 are slotted together so as to obtain a sliding link with the movement of separation or coming closer of the end plates 8,9. In this simple example, the guiding cylinders 14, 15 are adjusted by a sliding adjustment. The guiding cylinders 14, 15 can, as a variant, comprise any other element making a sliding link such as low friction bushes, roller bearings etc. The guiding cylinders 14, 15 can also be cylinders with circular bases, or any other suitable base shape.

The significant quantity of potential elastic energy contained in the emergency opening device in the retracted position makes this efficient linear guide of the tubular actuating member imperative when the spring 10 is released.

The emergency opening device further comprises an expansion regulator 16, which is arranged here inside the tubular spring 10. The expansion regulator 16 is intended to control the movement of the aircraft door and can perform different functions, independently or combined.

For example, the expansion regulator 16 can allow the emergency opening movement of the aircraft to be controlled. For example, over one range of the opening travel, the door should reach the maximum opening speed allowed by the energy supplied to it by the spring 10, while over other opening ranges, the door should reduce its speed. The expansion regulator 16 can in particular significantly reduce the opening speed at the start of opening travel so as to facilitate the opening of the toboggan and at the end of opening travel so as to prevent the possible damage caused by the door encountering the end of travel stops at full speed.

Another possible function for the expansion regulator 16 is to control the opening and closing movements of the door during normal use thereof, outside the emergency opening phases. The aircraft door thus has no need of a disengagement device, as it is possible to open and close the door while the emergency opening device is held in its retracted position. The moving away or coming closer movement of the two connecting ends 1,2 is permitted by the expansion regulator, which can furthermore exert a variable resistance to the movement of the door.

The expansion regulator 16 can also have the function of motorizing the movement of the door in the case of automatic doors. The expansion regulator 16 is then controlled like a jack with the supply of a pressurized fluid allowing automatic opening and closing of the door, at the same time holding the emergency opening device in the retracted position.

The architecture of the emergency opening device described here implements this expansion regulator 16 in a central position (as close as possible to the axial direction 32), with a linear guide (guiding cylinders 14,15) radially arranged at the periphery of the expansion regulator 16, the linear guide and the expansion regulator 16 being interlinked. The spring 10 is also radially arranged at the periphery of the linear guide, and the retention and triggering means being finally radially arranged at the periphery of the spring 10.

This particularly compact architecture integrates all the combined functions of an emergency opening device and an expansion regulator in the form of a single component of the jack type, easy and quick to install during aircraft production and to replace during maintenance.

The expansion regulator 16 here comprises:
- a jack chamber 17, which is delimited by the inner guiding cylinder 14, by the first end plate 8 and by a bottom wall 20;
- a mobile piston 18 in the chamber 17 along the axial direction 32.

The piston 18 is connected by a rod 19 (fixed or hinged) to the second connecting end 2. The rod 19 passes through the bottom wall 20 via a sliding seal and passes through the second end plate 9. A stop 21 is furthermore provided on the rod 19 between the second end plate 9 and the second connecting end 2. The opening and closing movements of the aircraft door are thus permitted, perhaps controlled or motorized, by the movement of the piston 18 in the chamber 17, while the emergency opening device is held in its retracted position (see FIG. 5 and its description below). When the emergency opening device is triggered, the spring 10 causes the two end plates 8, 9 to separate (guided by guiding cylinders 14, 15), the second end plate 9 carrying the stop 21 and therefore the second connecting end 2 in its movement, which causes the emergency opening of the door.

The chamber 17 can be associated if necessary with fluid pipes (not illustrated) leading either side of the piston 18, and with hydraulic means of control, protection and temperature compensation.

Figure 2:
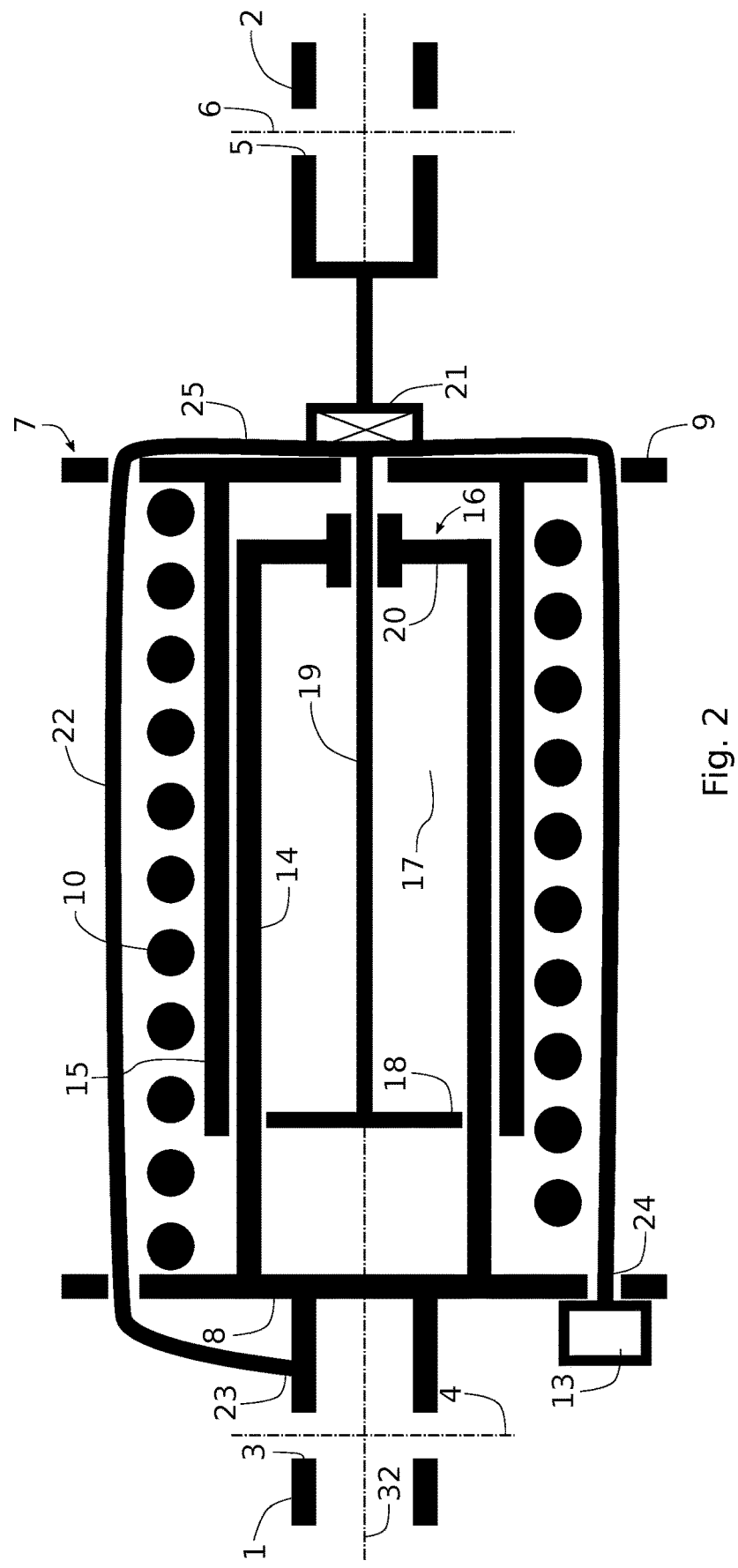
FIG. 2 is a schematic view in section of an emergency device according to a second embodiment of the invention.

FIG. 2 is a schematic view similar to FIG. 1, illustrating a second embodiment of the emergency opening device.

The elements that are common to the different embodiments have the same numbers for reference to the figures.

According to this second embodiment, the retaining member here comprises a single peripheral attachment consisting of a retaining wire 22.

The retaining wire 22 consists of any wire element or group of wire elements, able to work in tension so as to ensure that the actuating member is held in the retracted position. The retaining wire can consist of one or more strands of wire, braided or not braided, of metal, textile or composite material or non-textile material.

The retaining wire 22 comprises a first end 23 attached in this example to the first connecting end 1 by any appropriate means (screwing, clamping, crimping, etc.), and a second end 24 attached to the triggering means, which consist here of a disengageable head 13. The retaining wire makes at least one return travel between these two end plates 8,9. The retaining wire passes a first time through the first end plate 8 to the second end plate 9, which it passes through, it then comprises a loop 25 extending radially against the second end plate 9, then to pass once again through the second end plate 9 towards the first end plate 8, which it passes through once again to return to the disengageable head 13.

The emergency opening device is triggered in the same way as in the first embodiment, by disengaging the disengageable head 13 such that the retaining wire 22 is liberated and can slide in the different openings it passes through within the end plates 8,9, such that the spring 10 is no longer contained, which allows the tubular actuating member to pass to its deployed position.

Figure 3:
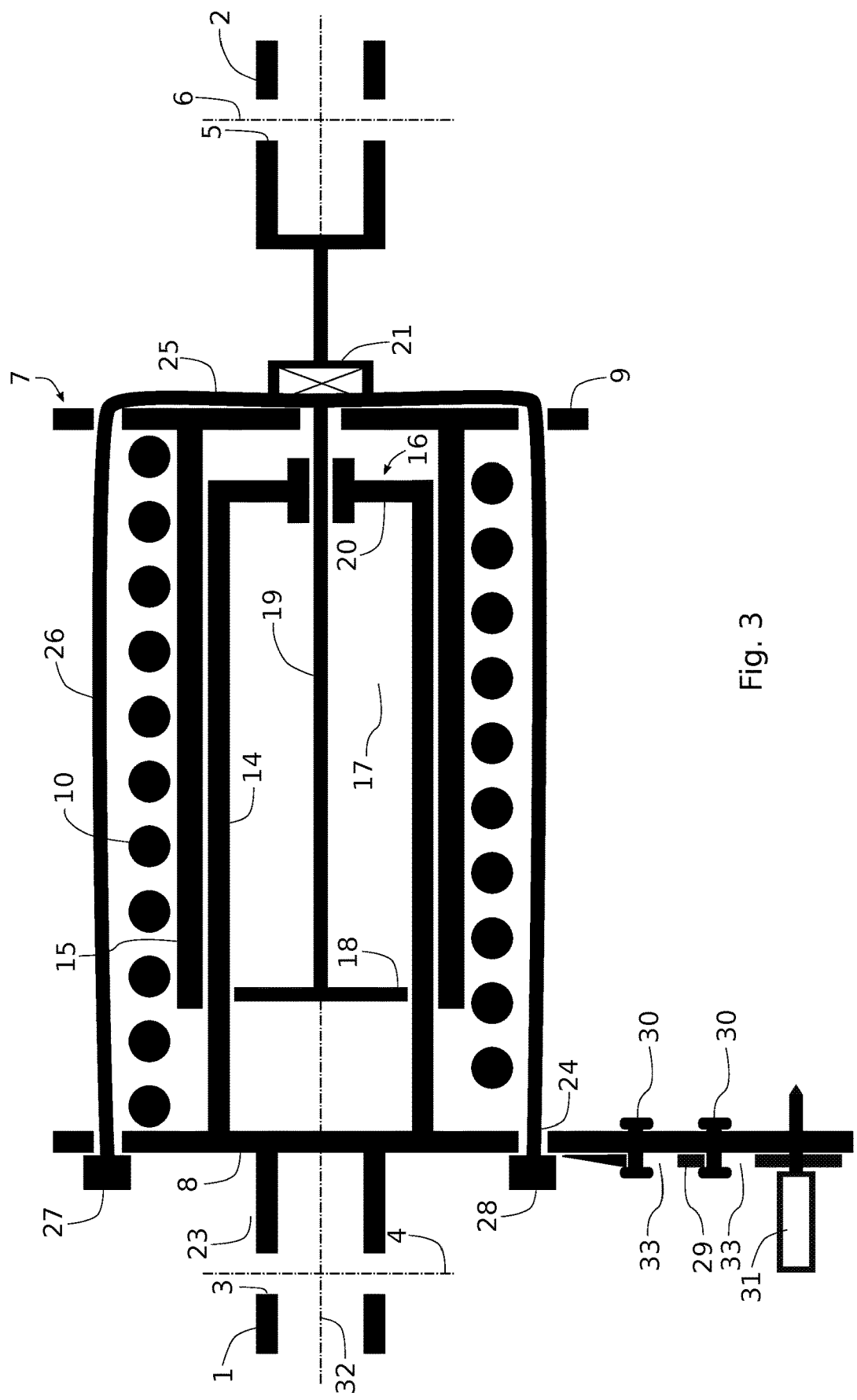
FIG. 3 is a schematic view in section of an emergency device according to a third embodiment of the invention.

FIG. 3 illustrates an embodiment of the invention, which is entirely mechanical, without resorting to any power supply or control cables.

According to this third embodiment, the retaining member comprises a peripheral attachment, which consists of a retaining wire 26 arranged at the radial periphery of the spring 10 in a way similar to the retaining wire of the second embodiment. The retaining wire 26 comprises a first head 27, which immobilizes it in an orifice of the first end plate 8 and comprises a second head 28, which immobilizes it in another orifice of the first end plate 8.

The retaining wire 26 here is a breakable wire and the triggering means comprise a member for transversally severing the retaining wire 26. This severing member can comprise any suitable means for cutting the retaining wire, such as a rotating or translated knife, or scissors. In the illustrated example, the severing member is a severing knife 29, mobile in translation on two inserts 30 and secured by a pin 31.

The retaining wire is preferably designed, in its structure and in the choice of its material, to have high tensile strength while presenting low resistance to a transversal cutting operation, which is the case for example with a certain number of ropes. In a particularly advantageous embodiment, the retaining wire 22 consists of a bundle of carbon or aramid fibers, which have the advantage of very high tensile rupture values while having low resistance to transversal cutting. The spring 10 can be provided with very high strength, capable, in an emergency opening operation, of rapidly starting to move a massive aircraft door (such as the doors of long-haul aircraft, which are increasingly complex and increasingly heavy, in addition to their substantial size), at the same time holding, perhaps reducing the force needed to trigger the emergency opening device.

Figure 4:
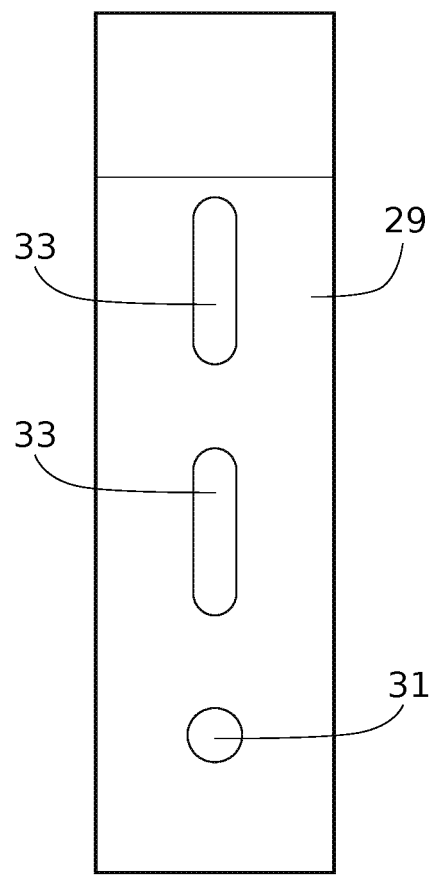
FIG. 4 illustrates the knife for severing the device of FIG. 3.

FIG. 4 is a front view of the severing knife 29 showing the upper cutting part and the two oblong holes 33 allowing its movement in translation.

When users wish to trigger the emergency opening system, they remove the pin 31 then actuate the severing knife 29 in translation, which causes the retaining wire 26 to be cut and the spring 10 to be released, then the actuating member 7 to pass to its deployed position.

The two-dimensional schematic view of FIGS. 3 and 4 shows the stop 21 close to the retaining wires 22,26, on the understanding that, in a practical implementation, it will be necessary to make sure that the path of the retaining wire 22,26 does not interfere with the work of the stop 21.

Figure 5:
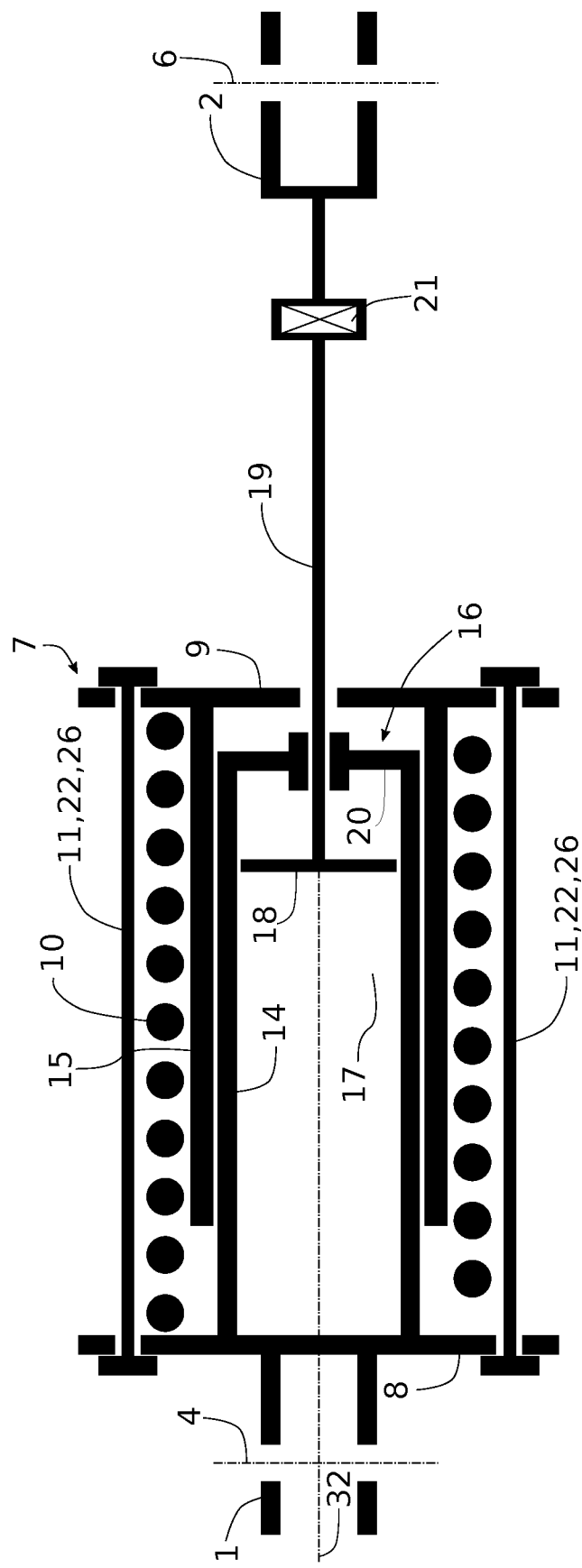
FIG. 5 illustrates an emergency opening device in an intermediate opening position.

FIG. 5 illustrates the function of opening the emergency opening device for service. In the framework of this function, the emergency opening device is able to occupy intermediate positions allowing the door to open in normal functioning, without triggering the emergency opening device.

FIG. 5 illustrates an emergency opening device according to the invention, which can conform to any one of the preceding embodiments. The illustrated device comprises peripheral attachments 11,22, which can be tensioning bars and/or retaining wires on which triggering means such as described previously act.

According to this opening for service function, the device is not triggered (the tubular actuating member 7 being held in its retracted position), whereas hydraulic control means allow, perhaps activate, the movement of the piston 18 in the chamber 17. In this configuration, the aircraft door is free to be opened or closed, benefiting from the action of the expansion regulator 16, without interfering with the emergency opening function. It is only when the emergency opening device is triggered that the tubular actuating member will take over by means of the stop 21, and will force the assembly to its deployed opening position.

Variants of the embodiments described here can be envisaged. For example, the passage paths of the retaining wires of embodiments 2 and 3 can be different from those described here and comprise different loops, on condition that the release of the retaining wire allows the release of the spring 10.

Furthermore, the attachments of the different embodiments can be combined. For example, the emergency opening device of the second embodiment can be completed by a severing member like that of the third embodiment, so as to combine a possibility of commanded triggering with a possibility of manual triggering. As a further example, the peripheral attachments can be arranged as in the first embodiment, but consist of different retaining wires, with one or more suitable severing members.

The invention claimed is:

1. A device for emergency opening of an aircraft door comprising:
   a tubular actuating member (7) extending along an axial direction (32), provided with a first connecting end (1) and a second connecting end (2), the tubular actuating member (7) being switchable between a retracted rest position and a deployed opening position;
   an elastic compression device to attract the tubular actuating member (7) from the retracted rest position to the deployed opening position;
   a retaining member for retaining the tubular actuating member in the retracted rest position with compression of the elastic compression device maintained;
   a triggering device to liberate the retaining member and to cause the tubular actuating member to pass to the deployed opening position due to an expansion effect of the elastic compression device;
   the tubular actuating member (7) comprises a first end plate (8), situated towards the first connecting end (1), and a second end plate (9), situated towards the second connecting end (2);
   the elastic compression device comprises a tubular spring (10) compressed between the first end plate (8) and the second end plate (9);
   an expansion regulator (16) arranged inside the tubular spring (10);
   the retaining member comprises at least one peripheral attachment connecting the first end plate (8) to the second end plate (9), the peripheral attachment being radially outside the tubular spring (10).

2. The device as claimed in claim 1, wherein the retaining member comprises a plurality of peripheral attachments radially outside the tubular spring (10), each one of the peripheral attachments comprising a retaining bar (11).

3. The device as claimed in claim 2, wherein each one of the retaining bars (11) extends between an opening made in the first end plate (8) and an opening made in the second end plate (9) and comprises at one end a fixed head (12), the triggering device comprising a disengageable head (13) at the other end of the retaining bar (11).

4. The device as claimed in claim 1, wherein the peripheral attachment comprises a retaining wire (22, 26).

5. The device as claimed in claim 4, wherein the retaining wire (22, 26) makes at least one return travel between the first end plate (8) and the second end plate (9).

6. The device as claimed in claim 4, wherein the triggering device comprises a disengageable head (13) fixing one end of the retaining wire (22) with respect to an orifice of one of the end plates.

7. The device as claimed in claim 4, wherein the triggering device comprise a transverse member (29) for transversally severing the retaining wire (26).

8. The device as claimed in claim 1, wherein the first end plate (8) comprises an inner guiding cylinder (14) extending along the axial direction (32) and that the second end plate (9) comprises an outer guiding cylinder (15) extending in the axial direction (32), the inner guiding cylinder (14) and the outer guiding cylinder (15) being concentric and slotted together along a sliding link.

9. The device as claimed in claim 8, wherein the expansion regulator (16) comprises a jack chamber (17) delimited by the inner guiding cylinder (14).

10. The device as claimed in claim 9, wherein the expansion regulator (16) comprises a mobile piston (18) in the jack chamber (17), oriented along the axial direction (32).

11. The device as claimed in claim 10, wherein the piston (18) is connected by a rod (19) to the second connecting end (2), the rod (19) passing through a bottom wall (20) of the inner guiding cylinder (14) and through the second end plate (9).

12. The device as claimed in claim 11, wherein the rod (19) comprises a stop (21) for driving the rod (19) through the second end plate (9).

13. The device as claimed in claim 12, wherein the stop (21) is arranged a the portion of the rod (19) that is situated between the second end plate (9) and the second connecting end (2).

* * * * *